United States Patent
Koelzer

(10) Patent No.: US 10,502,329 B2
(45) Date of Patent: Dec. 10, 2019

(54) RESERVOIR PURGE VALVE

(71) Applicant: HALDEX BRAKE PRODUCTS CORPORATION, Kansas City, MO (US)

(72) Inventor: Robert L. Koelzer, Olathe, KS (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 0 days.

(21) Appl. No.: 14/948,517

(22) Filed: Nov. 23, 2015

(65) Prior Publication Data
US 2017/0146137 A1    May 25, 2017

(51) Int. Cl.
*F16K 31/126* (2006.01)
*F16K 27/02* (2006.01)
(Continued)

(52) U.S. Cl.
CPC ............ *F16K 11/022* (2013.01); *B60T 15/36* (2013.01); *B60T 17/004* (2013.01); *F16K 7/17* (2013.01);
(Continued)

(58) Field of Classification Search
CPC ......... Y10T 137/7771; Y10T 137/7778; Y10T 137/7779; Y10T 137/7879; Y10T 137/7888; Y10T 137/7895; G05D 16/063; G05D 16/0633; G05D 16/0636; F16K 7/17; F16K 15/144; F16K 15/145; F16K 15/14;
(Continued)

(56) References Cited

U.S. PATENT DOCUMENTS

| 891,808 A | 6/1908 | Adams |
| 948,344 A | 2/1910 | Radick |

(Continued)

FOREIGN PATENT DOCUMENTS

| FR | 1363011 | 4/1964 | |
| GB | 1055758 A | * 1/1967 | ........... B05B 1/3006 |

OTHER PUBLICATIONS

Jim Wilson; Air Compressor Automatic Drain Valve; http://www.paragoncode.com/shop/compressor/; 2001, 2002, 4 pages.

(Continued)

*Primary Examiner* — Reinaldo Sanchez-Medina
*Assistant Examiner* — Hailey K. Do
(74) *Attorney, Agent, or Firm* — Stinson LLP

(57) ABSTRACT

A valve having an inlet, exhaust, control port, and diaphragm. The diaphragm moves between an open position, in which the inlet and exhaust are in fluid communication, and a closed position, in which the diaphragm blocks fluid from flowing between the inlet and the exhaust. The diaphragm moves from the closed position to the open position when an inlet force due to pressure at the inlet is greater than the sum of the biasing force and a control port force due to pressure at the control port. The valve is operable to automatically drain contaminants from a vehicle air reservoir when the vehicle's emergency brakes are set. To reduce noise, the diaphragm of the valve is preferably in tension when in the closed position, and/or the diaphragm opens a limited distance when in the open position so that a back pressure is generated at the inlet.

20 Claims, 7 Drawing Sheets

(51) Int. Cl.
  *F16K 47/04* (2006.01)
  *F16K 11/02* (2006.01)
  *B60T 15/36* (2006.01)
  *B60T 17/00* (2006.01)
  *F16T 1/14* (2006.01)
  *F16K 7/17* (2006.01)

(52) U.S. Cl.
  CPC ...... *F16K 27/0236* (2013.01); *F16K 27/0263* (2013.01); *F16K 31/1262* (2013.01); *F16K 31/1266* (2013.01); *F16K 47/04* (2013.01); *F16T 1/14* (2013.01); *Y10T 137/7895* (2015.04)

(58) Field of Classification Search
  CPC ...... F16K 15/12; F16K 17/04; F16K 17/0453; F16K 17/085; F16K 31/1262; F16K 31/1266; B60T 15/022; B60T 15/024; B60T 15/027; B60T 15/041
  USPC ...................... 251/61.1, 61.2, 61.5
  See application file for complete search history.

(56) References Cited

U.S. PATENT DOCUMENTS

| | | | |
|---|---|---|---|
| 1,001,040 A | 8/1911 | Johnsonbaugh | |
| 1,801,853 A | 4/1931 | Farmer | |
| 2,077,515 A | 4/1937 | Campbell | |
| 2,328,649 A | 9/1943 | Jerome | |
| 2,383,244 A | 8/1945 | Farmer | |
| 2,418,440 A | 4/1947 | White et al. | |
| 2,485,232 A | 10/1949 | Brown | |
| 2,509,597 A | 5/1950 | Hamilton | |
| 2,639,194 A * | 5/1953 | Wahlin | B05B 1/28 137/510 |
| 2,687,841 A | 8/1954 | Churchman | |
| 2,810,393 A | 10/1957 | Fites | |
| 3,262,464 A | 7/1966 | Frantz | |
| 3,575,199 A | 4/1971 | Beattie | |
| 3,580,267 A | 5/1971 | Baker | |
| 3,659,625 A | 5/1972 | Ronald et al. | |
| 3,682,194 A | 8/1972 | Pyle | |
| 3,866,982 A | 2/1975 | Geier et al. | |
| 3,977,426 A | 8/1976 | Pyle | |
| 4,146,275 A | 3/1979 | Elliott et al. | |
| 4,181,151 A * | 1/1980 | Ensign | F16K 7/17 137/625.28 |
| 4,883,995 A | 11/1989 | Rink, Jr. | |
| 4,928,724 A | 5/1990 | Margerum | |
| 4,987,919 A | 1/1991 | Boutin | |
| 5,090,659 A * | 2/1992 | Bronnert | F16K 7/17 251/61.1 |
| 5,144,974 A | 9/1992 | Gaudin | |
| 5,154,204 A | 10/1992 | Hatzikazakis | |
| 5,205,315 A | 4/1993 | Margerum | |
| 5,383,646 A * | 1/1995 | Weingarten | G05D 16/163 251/30.02 |
| 5,435,422 A | 7/1995 | Chille, Sr. | |
| 5,529,280 A | 6/1996 | Satoh et al. | |
| 5,564,466 A * | 10/1996 | Aoyama | B60K 15/03519 123/518 |
| 5,592,754 A | 1/1997 | Krieder et al. | |
| 5,738,138 A | 4/1998 | Grunert et al. | |
| 5,762,094 A | 6/1998 | Hendershot et al. | |
| 5,857,486 A * | 1/1999 | Walker | F16K 17/085 137/115.27 |
| 5,865,208 A | 2/1999 | Chovan | |
| 5,909,747 A | 6/1999 | Schieber | |
| 5,941,271 A | 8/1999 | Chovan | |
| 6,164,312 A | 12/2000 | Bostedo et al. | |
| 6,170,511 B1 | 1/2001 | Bostedo et al. | |
| 6,227,520 B1 | 5/2001 | Huber, Jr. | |
| 6,238,013 B1 | 5/2001 | Koelzer | |
| 6,267,135 B1 | 7/2001 | Ho | |
| 6,588,856 B2 | 7/2003 | Herbst et al. | |
| 6,755,114 B2 * | 6/2004 | Onoe | B29C 47/1009 251/65 |
| 7,210,466 B1 * | 5/2007 | Roche | F02M 25/0836 123/519 |
| 7,338,550 B2 | 3/2008 | Hoffman | |
| 8,511,929 B2 | 8/2013 | Raye et al. | |
| 8,777,169 B2 | 7/2014 | Raye et al. | |
| 2007/0251781 A1 | 11/2007 | Thomas | |
| 2007/0252103 A1 | 11/2007 | Wu | |
| 2014/0251437 A1* | 9/2014 | Raye | B60T 17/04 137/1 |

OTHER PUBLICATIONS

Paul Lapczynski; Automatic Compressor Drain; Toolmonger; http://toolmonger.com/2009/02/10/automatic-compressor-drain/; Feb. 10, 2009, 5 pages.
Haldex, Pilot Valve, offered for sale prior to Mar. 5, 2012, 1 page, Haldex, USA.
Haldex, Installation Instructions Dolly Module System (DMS-SA) with Brake Monitoring System (BMS-1) for Single Axle Dollies, Jul. 2010, 16 pages, Haldex, USA.
Haldex, Trailer Module System (TMS) with Brake Monitoring System (BMS-1), Jul. 2011, 16 pages, Haldex, USA.
Haldex, Air Valves—Automatic Drain Valve, Aug. 2008, 2 pages, Haldex Brake Products Corporation, USA.
Bendix, Service Data, Bendix® DV-2™ Automatic Reservoir Drain Valve, SD-03-2501, Mar. 2007, 4 pages, Bendix Commercial Vehicle Systems LLC, USA.
Stemco, Moisture Ejector Installation Instructions, Nov. 2006, 2 pages, Form 344, Stemco, USA.
Extended European Search Report for related application EP 16198329.1, dated Apr. 28, 2017.

* cited by examiner

RESERVOIR PURGE VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention is directed to a valve and, in particular, to a valve configured for automatically purging water and other contaminants from a compressed air reservoir.

2. Description of Related Art

Large vehicles, such as buses, trucks, trailers, construction equipment, and recreational vehicles, typically have a pneumatic braking system that runs on compressed air. An air compressor, powered by the vehicle's engine, compresses air that is stored in an air reservoir. Compressing air causes water vapor, oil, and other contaminants to collect in the bottom of the air reservoir. If these contaminants are not removed from the air reservoir on a regular basis, they can damage the air reservoir, enter the braking system and damage the braking components.

A conventional air reservoir typically includes a drain valve that must be manually opened by the vehicle's operator to remove contaminants from the air reservoir. While the drain valve should be opened on a regular basis, such as whenever the engine is turned off, drivers often do not drain the contaminants from the air reservoir on a regular basis, which can damage the air reservoir and braking system.

Automatic purge valves have been developed to automatically purge the contaminants from an air reservoir based upon the occurrence of a specific event, such as an air compressor turning on/off, an ignition turning on/off, and a periodic timer expiring. Each of these types of automatic purge valves requires electrical power or a connection to the air compressor to activate the valve. These valves cannot be used when the air reservoir does not have access to electrical power or the air compressor, such as when the air reservoir is mounted on a trailer. There are also automatic purge valves, such as described in U.S. Pat. No. 5,205,315 to Margerum and U.S. Pat. No. 5,865,208 to Chovan, that open when a vehicle's parking brake is engaged to automatically drain moisture from the air reservoir when the vehicle is parked. These valves, however, may be fairly noisy when operated.

BRIEF SUMMARY OF THE INVENTION

The present invention is directed to a valve that may be used to automatically purge contaminants from an air reservoir when the emergency or parking brakes of a vehicle, such as a bus, truck, trailer, dolly, semi-truck, semi-trailer, train, construction equipment, tractor, farm equipment, and recreational vehicle, are set. For a trailer or dolly, if the towing vehicle is detached from the trailer or dolly, the system also automatically purges contaminants from the air reservoir because the emergency brake line is disconnected when the trailer or dolly is detached.

In one preferred embodiment, the valve has an inlet, an exhaust, a control port, and a diaphragm moveable between an open position, in which the inlet and exhaust are in fluid communication, and a closed position, in which the diaphragm blocks fluid from flowing between the inlet and the exhaust. Control port fluid entering the control port exerts a control port force on the diaphragm, inlet fluid entering the inlet exerts an inlet force on the diaphragm, and a biasing force, preferably from a spring, is exerted on the diaphragm. The diaphragm moves from the closed position to the open position when the inlet force is greater than the sum of the biasing force and the control port force. When the valve is used to drain contaminants from an air reservoir on a vehicle, the control port is preferably connected to the vehicle's emergency brakes, and the inlet is preferably connected to the drain of the air reservoir. When the emergency brakes are released, the control port is pressurized to keep the diaphragm in the closed position. When the emergency brakes are set, the control port is not pressurized, and the diaphragm moves to the open position to drain contaminants from the air reservoir so long as the inlet force from the pressure in the air reservoir is greater than the biasing force.

The valve preferably includes at least one of the following noise reduction features. First, a portion of the diaphragm may be in tension when the diaphragm is in the closed position. The diaphragm preferably includes a moveable portion that is in tension because it is offset from a fixed portion of the diaphragm when the diaphragm is in the closed position. For a second noise reduction feature, the valve has a housing with a valve seat that is engaged by the diaphragm when in the closed position. The diaphragm is spaced a distance from the valve seat when the diaphragm is in the open position to create a gap between the valve seat and the diaphragm. The gap is configured so that a back pressure is generated at the inlet when the diaphragm moves from the closed position to the open position, which reduces noise by preventing vibration of the diaphragm.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
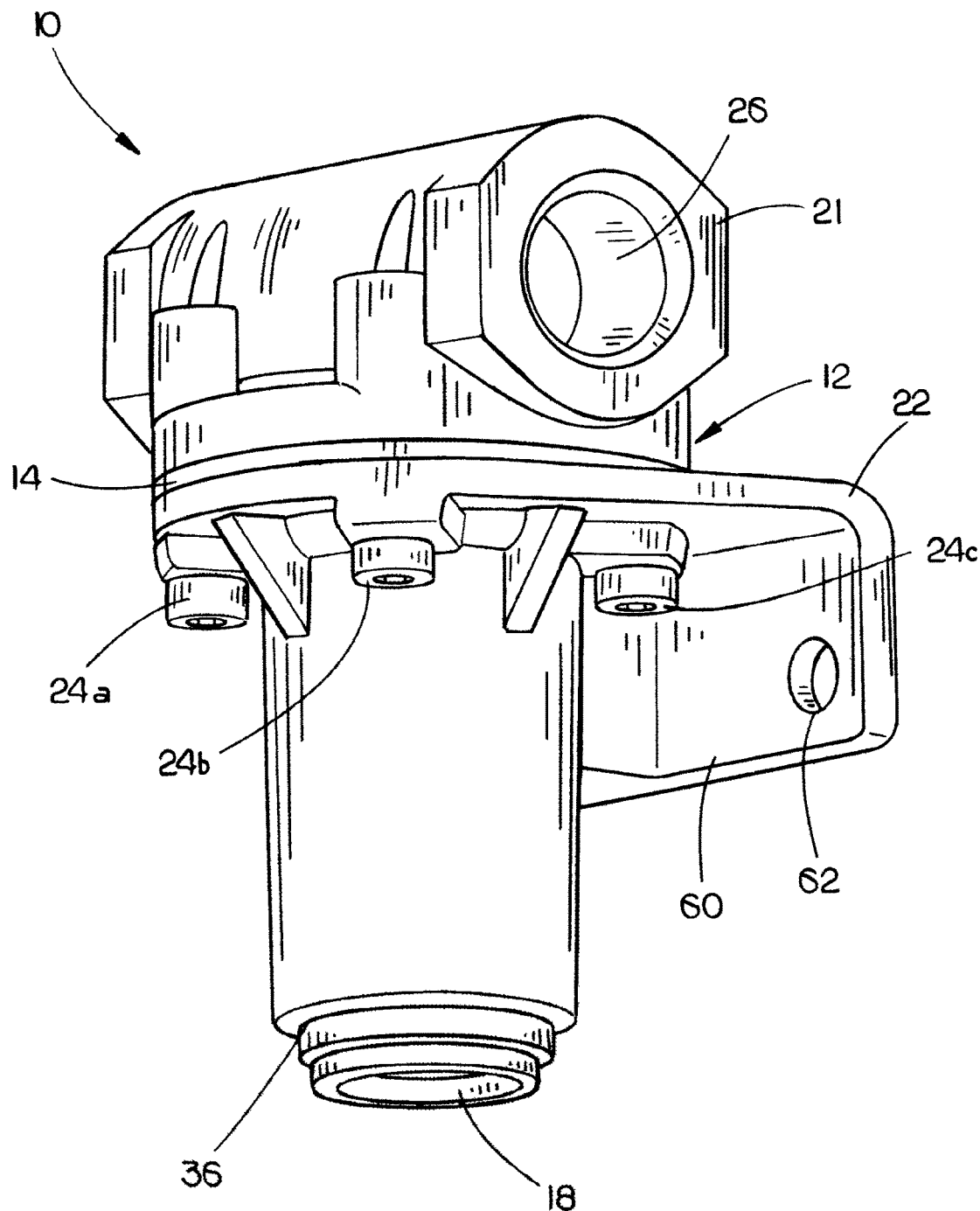
FIG. 1 is a perspective view of a reservoir purge valve in accordance with the present invention.
Figure 2:
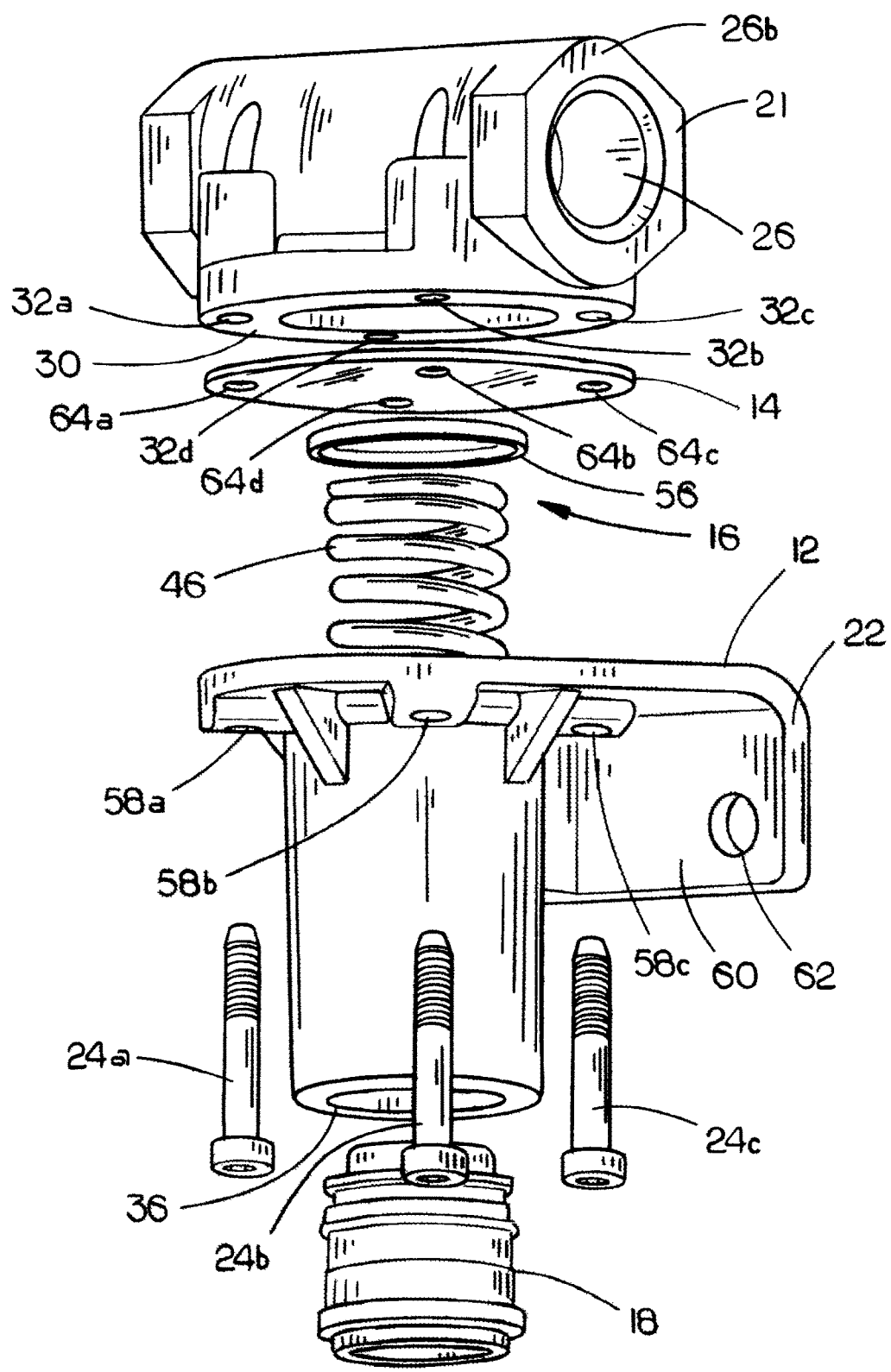
FIG. 2 is an exploded view of the valve of FIG. 1.

A reservoir purge valve in accordance with the present invention is shown generally in FIG. 1 as 10. Referring to FIG. 2, valve 10 includes a housing 12, a diaphragm 14, a spring assembly 16, and a push-to-connect fitting 18. As described in detail below, valve 10 is operable to automatically purge contaminants from the air reservoir 19 (FIG. 7) of a vehicle when the vehicle's emergency brakes 20 are set. Further, the valve 10 shuts off to prevent further depletion of air within the air reservoir 19 when the pressure within the air reservoir 19 is at a level sufficient to release the emergency brakes 20 of the vehicle. As used herein, the term "vehicle" means any type of device used to transport passengers or cargo, including, but not limited to, a bus, truck, trailer, dolly, semi-truck, semi-trailer, train, construction equipment, tractor, farm equipment, and recreational vehicle. As used herein, the terms "emergency brake" and "parking brake" are used interchangeably and mean any braking system in a vehicle used to keep the vehicle stationary when the vehicle is parked or not in use.

Figure 3:
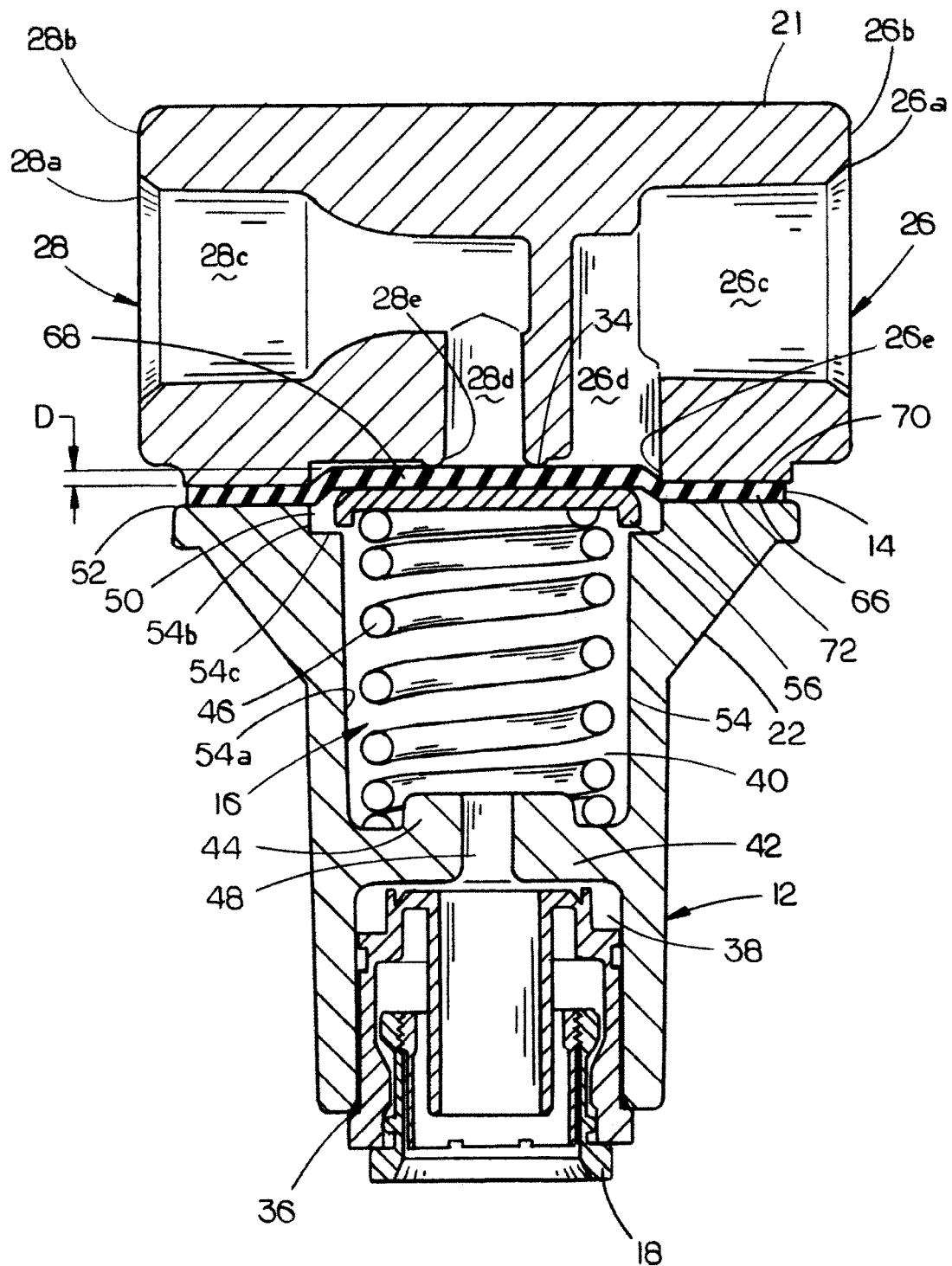
FIG. 3 is a cross-sectional view of the valve of FIG. 1 showing it in a closed position.

Housing 12 includes a first half 21 and a second half 22 that are joined with four bolts, three of which are shown as 24a-c in FIG. 1. As shown in FIG. 3, housing 12 has an inlet 26 and an exhaust 28 that are each formed in first half 21. Inlet 26 includes a circular opening 26a formed in a surface 26b of housing 12, a first passageway 26c extending into the housing 12 from opening 26a, and a second passageway 26d extending generally perpendicular from the first passageway 26c and terminating at an opening 26e in a surface 30 (FIG. 2) of housing 12. An interior surface of housing 12 surrounding passageway 26c is preferably threaded for engagement with the end of a hose 27 (FIG. 7) that is connected to the drain of air reservoir 19. Alternatively, hose 27 may be omitted if passageway 26c is directly connected to the drain of air reservoir 19. Exhaust 28 includes a circular opening 28a formed in a surface 28b of housing 12, a first passageway 28c extending into the housing 12 from opening 28a, and a second passageway 28d extending generally perpendicular from the first passageway 28c and terminating at an opening 28e in surface 30. An interior surface of housing 12 surrounding passageway 28c is preferably threaded for engagement with the end of a hose 29 (FIG. 7) that exhausts to the atmosphere or to an optional exhaust tank (not shown). Alternatively, no hose is connected to exhaust 28 so that fluid exiting exhaust 28 directly enters the atmosphere.

Surfaces 26b and 28b of housing 12 are generally parallel and positioned on opposite sides of housing 12. Surface 30 is generally perpendicular to surfaces 26b and 28b. As shown in FIG. 2, surface 30 includes four threaded openings 32a-d that receive bolts 24a-c. The housing 12 also includes an annular valve seat 34, shown in FIG. 3, that surrounds opening 28e of exhaust 28. Valve seat 34 is a rounded sealing bead that forms a seal with diaphragm 14 when the diaphragm 14 is in the closed position shown in FIG. 3.

A control port 36 is formed as an opening in the second half 22 of housing 12. Control port 36 opens into a chamber 38 that receives push-to-connect fitting 18. Push-to-connect fitting 18 is preferably connected to the fitting of a hose 39 (FIG. 7) that is connected to emergency brakes 20. Housing 12 includes a spring chamber 40 that is separated by chamber 38 via an annular wall 42. Spring assembly 16 is positioned within spring chamber 40. Wall 42 has a protrusion 44 that is received by an end of a spring 46 for positioning the spring 46 within the chamber 40. An opening 48 in wall 42 places control port 36 in fluid communication with spring chamber 40. An opening 50 is formed in a surface 52 of housing 12. Opening 50 is in fluid communication with spring chamber 40 and control port 36.

An inner wall 54 of housing 12 surrounding spring chamber 40 includes a first section 54a and a second section 54b having a greater diameter than the first section 54a. An annular surface 54c extends between the first and second sections 54a and 54b. Surface 54c is parallel to the surface 52. Surface 54c acts as a stop to engage a spring cup 56 and limit movement of diaphragm 14 when diaphragm 14 is in the open position shown in FIG. 4. Surface 52 includes four openings, three of which are shown as 58a-c in FIG. 2, that are aligned with openings 32a-d for receiving bolts 24a-c. Second half 22 of housing 12 includes a bracket 60 with a pair of openings, one of which is shown as 62 in FIG. 2, for mounting valve 10 to a surface, such as air reservoir 19 (FIG. 7) or the frame rail of a vehicle (not shown).

Figure 4:
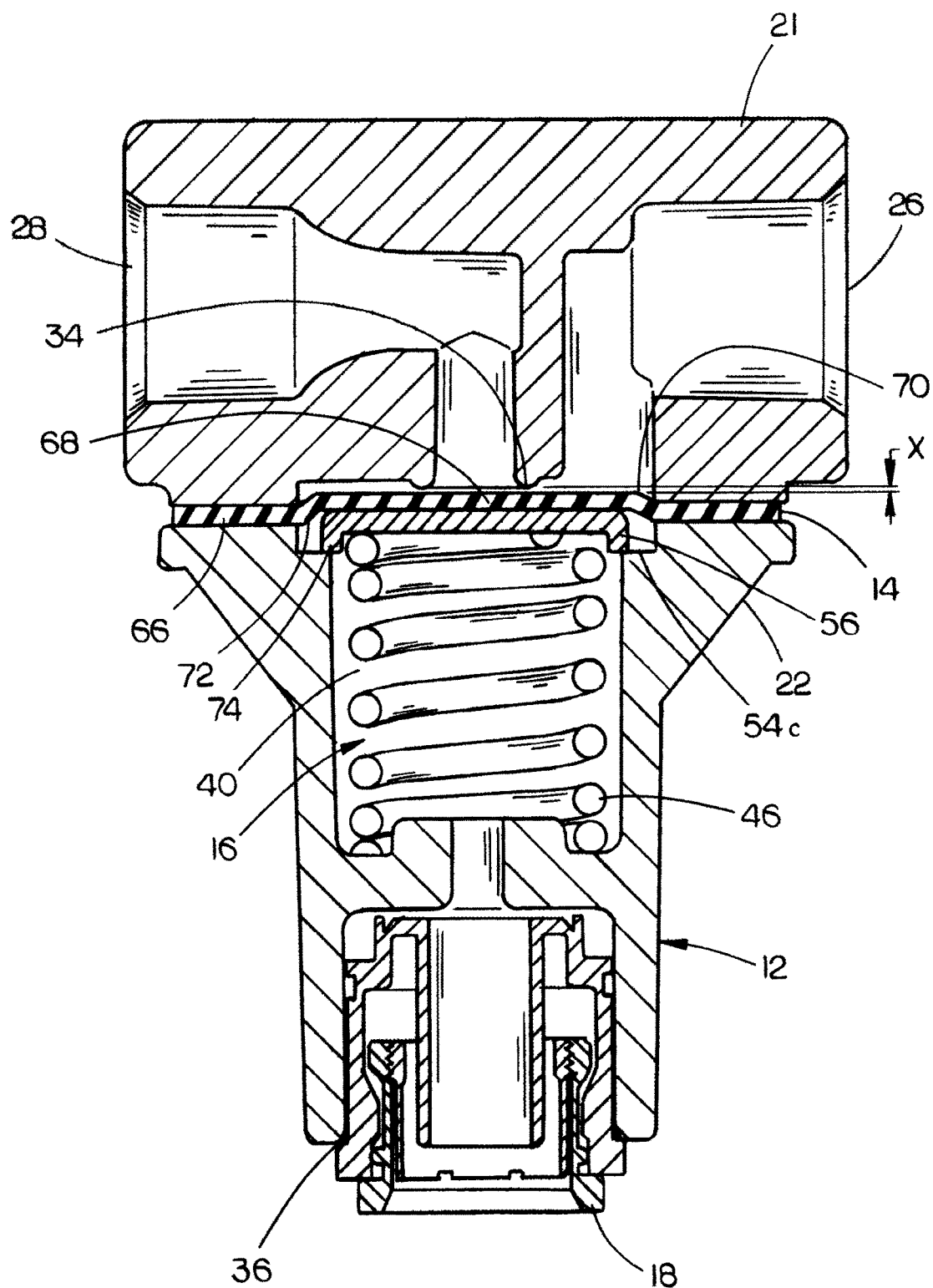
FIG. 4 is a cross-sectional view of the valve of FIG. 1 showing it in an open position.

Diaphragm 14 is clamped between the first and second halves 21 and 22 of housing 12 as shown in FIG. 3. Diaphragm 14 includes holes 64a-d (FIG. 2) that are aligned with the openings 32a-d in housing 12 for receiving bolts 24a-c. Referring to FIG. 4, diaphragm 14 includes an annular, fixed portion 66 that is clamped between first and second halves 21 and 22, and a circular, moveable portion 68 that is integral with and surrounded by the fixed portion 66. Fixed portion 66 is generally planar and does not move relative to the housing 12 due to it being clamped between first and second halves 21 and 22. Moveable portion 68 is positioned within housing 12 between spring chamber 40 on one side and inlet 26 and exhaust 28 on the other side. Diaphragm 14 has a first side 70 at least a portion of which is in fluid communication with inlet 26 and exhaust 28. Diaphragm 14 has a second side 72 at least a portion of which is in fluid communication with spring chamber 40 and control port 36.

Figure 5:
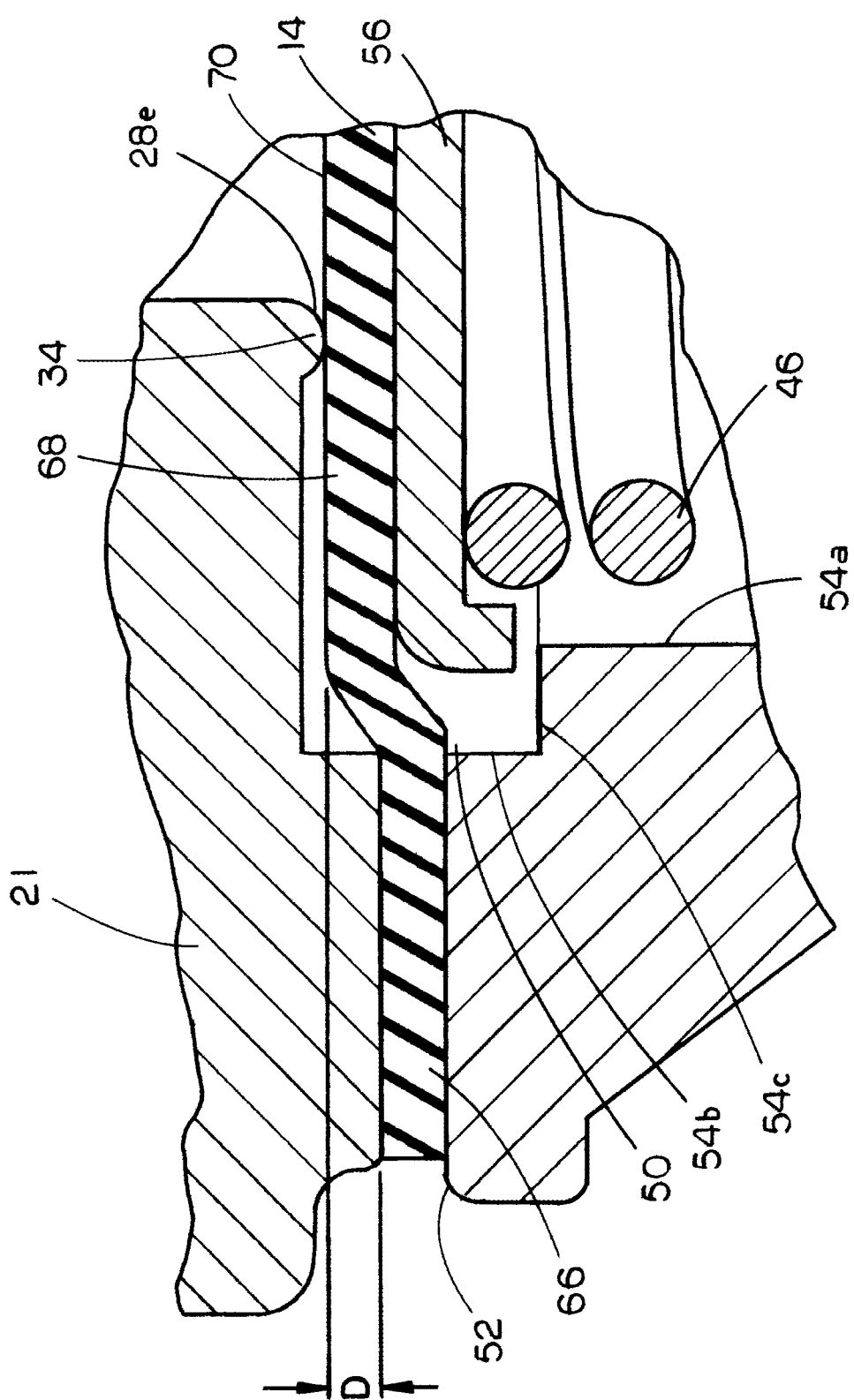
FIG. 5 is a close-up view of a portion of a diaphragm of the valve of FIG. 1 when in the closed position.

Moveable portion 68 of diaphragm 14 moves between the closed position shown in FIG. 3, in which the diaphragm 14 engages the valve seat 34 and blocks fluid from flowing between inlet 26 and exhaust 28, and the open position shown in FIG. 4, in which inlet 26 and exhaust 28 are in fluid communication. When diaphragm 14 is in the closed position shown in FIGS. 3 and 5, moveable portion 68 is offset a distance D from fixed portion 66 due to spring assembly 16 forcing diaphragm 14 into contact with valve seat 34. Distance D is the distance between the valve seat 34, or the first side 70 of moveable portion 68 that contacts valve seat 34, and the first side 70 of fixed portion 66 that contacts first half 21 of housing 12 in a direction that is generally perpendicular to fixed portion 66. Moveable portion 68 is in tension when the diaphragm 14 is in the closed position because moveable portion 68 of diaphragm 14 is offset the distance D from fixed portion 66. The distance D is most preferably between approximately 0.040 in. and 0.050 in. Prior to being clamped between first and second halves 21 and 22 of housing 12, diaphragm 14 is preferably generally planar. As shown in FIGS. 3 and 5, when diaphragm 14 is in the closed position, it is no longer planar due to moveable portion 68 being offset the distance D from fixed portion 66, which creates the tension in moveable portion 68. Diaphragm 14 is preferably elastomeric and resilient.

Figure 6:
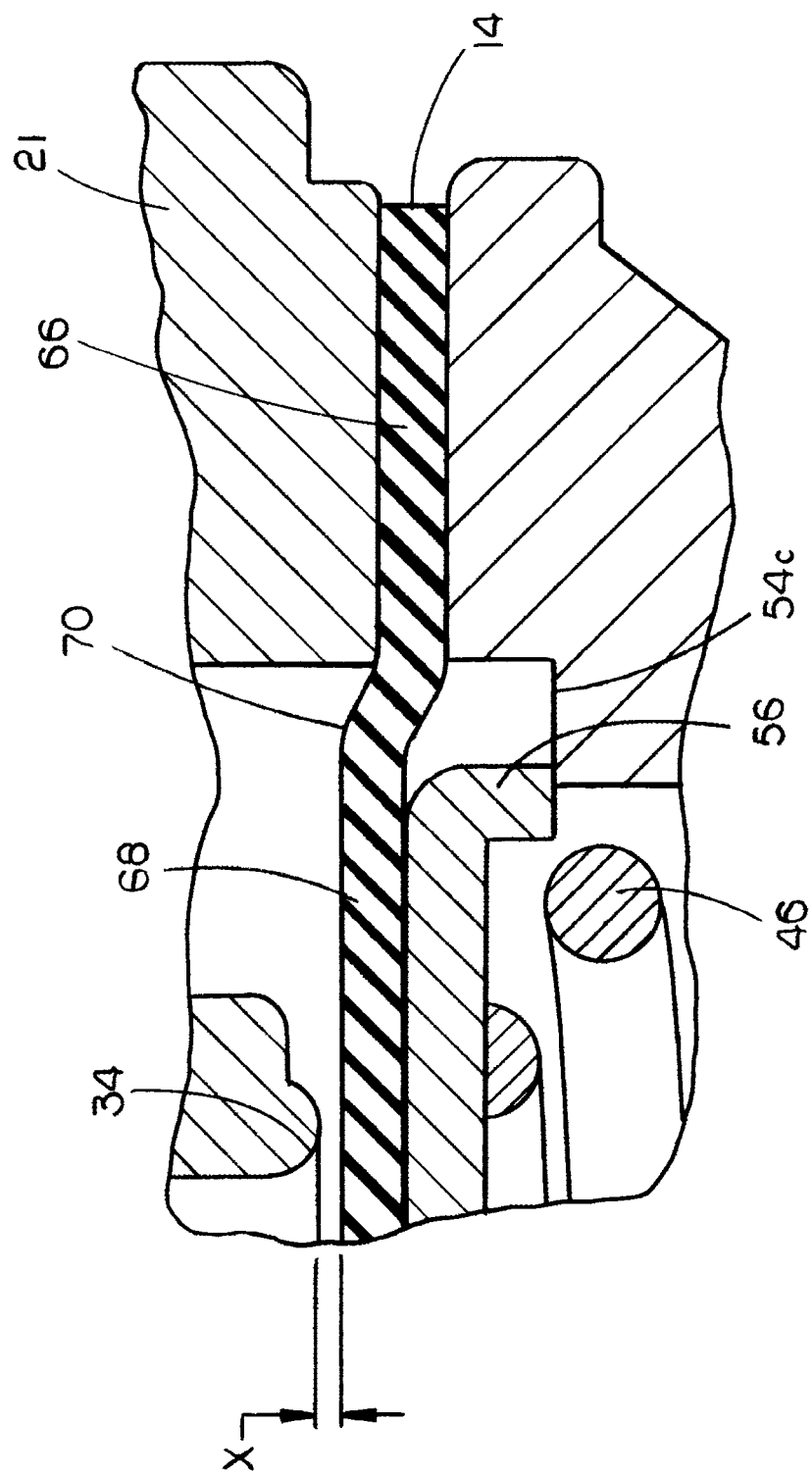
FIG. 6 is a close-up view of a portion of a diaphragm of the valve of FIG. 1 when in the open position.

When in the open position shown in FIGS. 4 and 6, diaphragm 14 is spaced a distance X from valve seat 34 to create a gap between valve seat 34 and diaphragm 14. When diaphragm 14 is in the open position, fluid flows from inlet 26 through the gap between valve seat 34 and diaphragm 14 and into exhaust 28. The distance X creating the gap is preferably configured so that a back pressure is generated at inlet 26, which is greater than the pressure of the fluid in exhaust 28, when the diaphragm 14 moves from the closed position to the open position. The distance X is most preferably between approximately 0.020 in. and 0.030 in. When air reservoir 19 is substantially fully pressurized, the back pressure generated at inlet 26 is preferably greater than 115 psi to ensure effective discharge of contaminants within air reservoir 19 and to reduce noise in valve 10 by preventing vibration of diaphragm 14. When air reservoir 19 is not fully pressurized, which may occur after a substantial amount of air is released from air reservoir 19, the back pressure at inlet 26 may drop below 115 psi.

Spring assembly 16, which includes spring 46 and spring cup 56, exerts a biasing force on the second side 72 of diaphragm 14 to bias diaphragm 14 to the closed position shown in FIG. 3. Spring 46 extends between wall 42 and spring cup 56, and spring cup 56 is positioned between spring 46 and diaphragm 14. Spring cup 56 is preferably joined to diaphragm 14 with adhesive. Spring cup 56 is circular and has a raised side wall 74, shown in FIG. 4, to retain the end of spring 46. Side wall 74 contacts surface 54c of housing 12 when diaphragm 14 is in the open position shown in FIG. 4 to limit the distance X of the gap between diaphragm 14 and valve seat 34. Spring cup 56 is preferably constructed from a rigid material.

Figure 7:
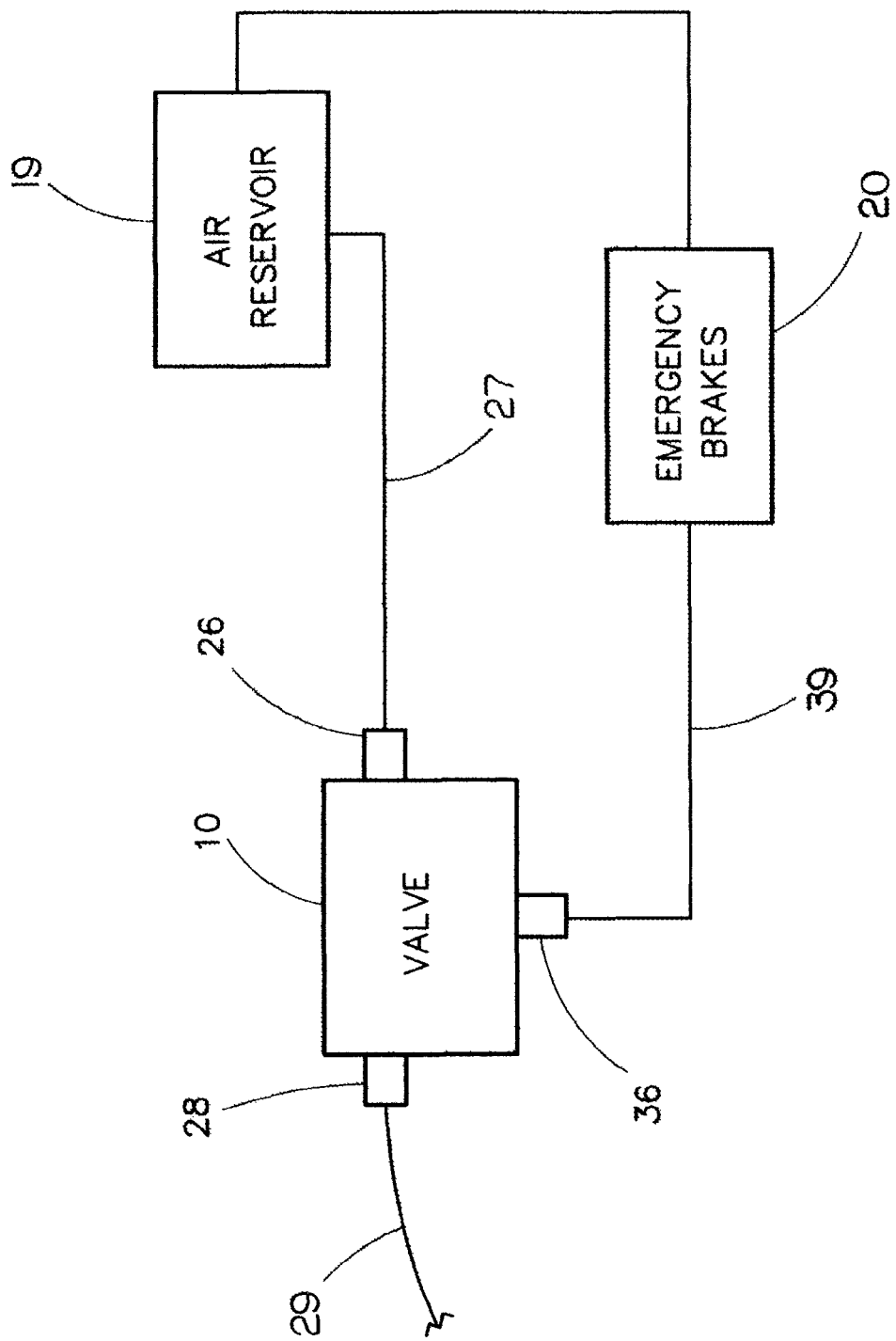
FIG. 7 is a schematic view of a vehicle air tank purge system that includes the valve of FIG. 1.

Air reservoir 19, shown in FIG. 7, supplies compressed air to a vehicle for various operations, including the regular operational brake system (not shown) and emergency brakes 20 through an air supply port. Air reservoir 19 has a drain that is connected to inlet 26 of valve 10 via hose 27. The drain is preferably an open port such that water and contaminants can fall through the port and settle within hose 27 before the purging process begins. In a preferred embodiment, the drain is on a low point or the bottom of air reservoir 19. A manual drain valve (not shown) may be connected to the drain of air reservoir 19 to allow an operator to drain the reservoir 19 manually independently of the operation of valve 10. Air reservoir 19 is any suitable reservoir operable to store and provide air pressure (directly or indirectly) to the regular operational brake system (not shown), emergency brakes 20, and other components on the vehicle. An example of one suitable air tank is the Air Tank (Reservoir) model 19840 manufactured by Haldex and having a volume of approximately 1488 cubic inches.

Emergency brakes 20 are a standard pneumatic vehicle emergency brake system. Emergency brakes 20 include an emergency brake at each wheel and emergency brake lines that fluidly connect the emergency brakes 20 to air reservoir 19. Typically, in pneumatic vehicle braking systems, the emergency brakes 20 are engaged by a spring in each emergency brake. To disengage the emergency brakes 20 for vehicle operation, the emergency brake lines are pressurized to compress the spring and disengage the emergency brakes 20 from preventing rotation of the wheels. The emergency brake lines are pressurized from air reservoir 19 and maintained at that pressure until the emergency brakes 20 are set by a driver. When the driver sets the emergency brakes 20, the pressure from the emergency brake lines is released, and the springs in the emergency brakes 20 expand to engage the emergency brakes 20. Emergency brakes 20 are fluidly connected to control port 36 via hose 39 such that control port 36 has substantially the same pressure as the emergency brakes 20.

In operation, fluid entering inlet 26 exerts an inlet force on first side 70 of diaphragm 14 in a first direction that is generally perpendicular to diaphragm 14 and oriented downward when viewed as shown in FIG. 3. The inlet force is equal to the pressure of the inlet fluid multiplied by the area of opening 26e when the diaphragm 14 is in the closed position. Fluid entering control port 36 exerts a control force on second side 72 of diaphragm 14 in a second direction that is generally perpendicular to diaphragm 14 and oriented upward when viewed as shown in FIG. 3. The control force is equal to the pressure of the control fluid multiplied by the area of diaphragm 14 spanning opening 50. Spring assembly 16 exerts a biasing force on second side 72 of diaphragm 14 in the second direction that is oriented upward when viewed as shown in FIG. 3. The inlet force is directed in the opposite direction as the control port force and the biasing force. The diaphragm 14 moves from the closed position shown in FIG. 3 to the open position shown in FIG. 4 when the inlet force is greater than the sum of the biasing force and the control port force.

Valve 10 is preferably used to automatically purge contaminants from air reservoir 19 (FIG. 7) on a vehicle when emergency brakes 20 of the vehicle are set. When used for this purpose, inlet 26 is connected to a drain of air reservoir 19 so that the pressure of the fluid at inlet 26 is substantially equal to the pressure of the fluid within air reservoir 19. Control port 36 is connected to an emergency brake line of the vehicle's emergency brakes 20. When the vehicle's emergency brakes 20 are released, the emergency brake line is pressurized. The pressurized fluid of the emergency brake line is delivered to control port 36 and generates the control port force acting to keep diaphragm 14 in the closed position along with the biasing force of spring assembly 16. When the vehicle's emergency brakes 20 are activated, the emergency brake line is not pressurized, meaning that no pressurized fluid is delivered through control port 36 and the control port force is approximately zero.

The area of opening 50, area of opening 26e, and spring 46 are preferably selected so that when a vehicle's emergency brakes 20 are released and the fluid within the emergency brake line is at a typical pressure level greater than 105 psig, the sum of the biasing force of spring 46 and control port force is greater than the inlet force caused by pressure from air reservoir 19 at a typical pressure level between 105 to 135 psig. This means that the diaphragm 14 remains in the closed position shown in FIG. 3 as the vehicle is being operated with the emergency brakes 20 released.

When the vehicle's emergency brakes 20 are activated and the fluid within the emergency brake line is released so that the control port force is approximately zero, the biasing force of spring 46 is preferably less than the inlet force caused by pressure from air reservoir 19 at the typical pressure levels listed above so that the inlet force acts to move diaphragm 14 from the closed position shown in FIG. 3 to the open position shown in FIG. 4. When the diaphragm 14 moves to the open position, air and contaminants from air reservoir 19 flow into inlet 26 and out of valve 10 through exhaust 28. As the air flows out of air reservoir 19, the pressure in air reservoir 19 decreases, and the inlet force acting on the first side 70 of diaphragm 14 also decreases. When the inlet force decreases to a level that is less than the biasing force of spring assembly 16, spring assembly 16 forces diaphragm 14 back to the closed position shown in FIG. 3. Spring 46 and the area of diaphragm 14 exposed to fluid from inlet 26 when diaphragm 14 is in the open position (which is approximately equal to the area of opening 50) are preferably configured so that spring 46 will move diaphragm 14 from the open position to the closed position when the fluid pressure at inlet 26 is between approximately 85 to 105 psig, more preferably between approximately 90 to 100 psig, and most preferably approximately 95 psig. Configuring spring 46 to close diaphragm 14 when the pressure at inlet 26 is within this range ensures that the fluid pressure within the vehicle's air reservoir 19 remains at a level that is sufficient to release the emergency brakes 20 of the vehicle without substantially increasing the pressure level within air reservoir 19. Thus, valve 10 automatically drains fluid and contaminants from within air reservoir 19 when the emergency brakes 20 of the vehicle are activated, and valve 10 closes to maintain the pressure within air reservoir 19 at a level that is sufficient to release the emergency brakes 20 so that the vehicle may be driven. Valve 10 operates without electricity or a connection to the vehicle's air compressor.

If the valve 10 and air reservoir 19 are located on a trailer or dolly that is towed by another vehicle, such as a semi-tractor, when the trailer or dolly is disconnected from the towing vehicle, emergency brakes 20 are disconnected from control port 36. Disconnection of emergency brakes 20 opens valve 10 to purge air reservoir 19 in the same manner described above with respect to activation of emergency brakes 20.

Valve 10 incorporates noise reduction features that reduce the level of sound emanating from valve 10 as diaphragm 14 moves between the closed and open positions. One of the noise reduction features is the tension in the moveable portion 68 of diaphragm 14 when the diaphragm 14 is in the closed position. As described above and shown in FIG. 5, the tension is created due to the moveable portion 68 being offset the distance D from fixed portion 66 when diaphragm 14 is in the closed position. The tension in diaphragm 14 reduces noise in valve 10 by maintaining the diaphragm in a state of tensile loading or preload.

Another noise reduction feature is the generation of a back pressure at inlet 26, which is greater than the pressure at exhaust 28, when diaphragm 14 moves from the closed position to the open position. As described above and shown in FIG. 6, the back pressure is generated by limiting the distance X between the diaphragm 14 and valve seat 34 when the diaphragm 14 is in the open position. The back pressure reduces noise in valve 10 by preventing vibration of diaphragm 14.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A valve for purging contaminants from an air reservoir on a vehicle, comprising:
    a housing comprising an inlet, an exhaust, a control port, a valve seat, and a wall spaced a fixed distance from the valve seat when the housing is assembled, wherein the inlet is configured for connection to an air reservoir, wherein the control port is configured for connection to a vehicle emergency brake system comprising at least one emergency brake, wherein the housing further comprises a bracket configured for mounting the housing to a surface, and wherein central axes of the inlet, the exhaust, and the control port are spaced from the bracket in a direction that is perpendicular to the central axes of the inlet, the exhaust, and the control port;
    a diaphragm positioned within the housing, wherein the diaphragm comprises a fixed portion that does not move relative to the housing and a moveable portion that is generally planar when not tensioned, wherein the moveable portion is moveable between an open position, in which the inlet and exhaust are in fluid communication, and a closed position, in which the moveable portion engages the valve seat to block fluid from flowing between the inlet and the exhaust, wherein the control port is configured so that control port fluid from the vehicle emergency brake system entering the control port exerts a control port force on the diaphragm, wherein the inlet is configured so that inlet fluid entering the inlet exerts an inlet force on the diaphragm, wherein a biasing force is exerted on the diaphragm, wherein the diaphragm is configured to move from the closed position to the open position when the inlet force is greater than the sum of the biasing force and the control port force, wherein a portion of the diaphragm is in tension when the diaphragm is in the closed position, and wherein the movable portion of the diaphragm is configured to move to the closed position when the vehicle emergency brake system is pressurized to disengage the emergency brake; and
    a spring comprising a first end that abuts the wall and a second end positioned adjacent the diaphragm, wherein the spring exerts the biasing force on the diaphragm when the diaphragm is in the closed position and when the diaphragm is in the open position.

2. The valve of claim 1, wherein the diaphragm is spaced a distance X from the valve seat when the diaphragm is in the open position to create a gap between the valve seat and the diaphragm, and wherein the gap is configured so that a pressure at the inlet is greater than a pressure at the exhaust when the diaphragm moves from the closed position to the open position.

3. The valve of claim 1, wherein the diaphragm comprises a first side at least a portion of which is in fluid communication with the inlet and the exhaust, wherein the diaphragm comprises a second side at least a portion of which is in fluid communication with the control port, and wherein the biasing force is exerted on the second side of the diaphragm.

4. The valve of claim 3, wherein the inlet force is exerted on the first side of the diaphragm in a first direction, and wherein the control port force and the biasing force are each exerted on the second side of the diaphragm in a second direction that is opposite to the first direction.

5. The valve of claim 1, wherein the moveable portion is offset a distance D from the fixed portion when the diaphragm is in the closed position.

6. The valve of claim 5, wherein the fixed portion is annular and surrounds the moveable portion.

7. The valve of claim 5, wherein the housing comprises first and second halves, wherein the fixed portion is clamped between the first and second halves, wherein aligned openings in the first and second halves are configured to receive fasteners for joining the first and second halves, wherein the bracket is integrally formed with the second half, and wherein central axes of the aligned openings are spaced from the bracket in a direction that is perpendicular to the central axes of the aligned openings.

8. The valve of claim 5, wherein the fixed portion of the diaphragm is generally planar, and wherein the valve seat is offset the distance D from the fixed portion in a direction that is generally perpendicular to the fixed portion.

9. The valve of claim 5, wherein the valve seat is annular.

10. The valve of claim 1, wherein the housing comprises a spring chamber within which the spring is positioned.

11. The valve of claim 10, further comprising a spring cup that is positioned between the spring and the diaphragm, and wherein the housing comprises a stop that engages the spring cup when the diaphragm is in the open position.

12. The valve of claim 11, wherein the diaphragm is elastomeric and the spring cup is rigid.

13. A valve for purging contaminants from an air reservoir on a vehicle, comprising:

a housing comprising an inlet, an exhaust, a control port, a valve seat, and a wall spaced a fixed distance from the valve seat when the housing is assembled,
wherein the inlet is configured for connection to an air reservoir and comprises a first opening formed in the housing, a first passageway extending into the housing from the first opening, and a second passageway extending generally perpendicular from the first passageway and terminating at a second opening,
wherein the exhaust comprises a third opening formed in the housing, a third passageway extending into the housing from the third opening, and a fourth passageway extending generally perpendicular from the third passageway and terminating at a fourth opening,
wherein the second passageway and the fourth passageway are spaced apart and generally parallel such that fluid flowing from the second passageway to the fourth passageway must turn approximately 180 degrees,
wherein the control port is configured for connection to a vehicle emergency brake system comprising at least one emergency brake, and
wherein the housing further comprises a bracket configured for mounting the housing to a surface, and wherein central axes of the inlet, the exhaust, and the control port are spaced from the bracket in a direction that is perpendicular to the central axes of the inlet, the exhaust, and the control port;
a diaphragm positioned within the housing, wherein the diaphragm is moveable between an open position, in which the diaphragm is spaced a distance X from the valve seat to create a gap between the valve seat and diaphragm and place the inlet and exhaust in fluid communication with each other, and a closed position, in which the diaphragm engages the valve seat to block fluid from flowing between the inlet and the exhaust, wherein the control port is configured so that control port fluid from the vehicle emergency brake system entering the control port exerts a control port force on the diaphragm, wherein the inlet is configured so that inlet fluid entering the inlet exerts an inlet force on the diaphragm, wherein a biasing force is exerted on the diaphragm, wherein the diaphragm is configured to move from the closed position to the open position when the inlet force is greater than the sum of the biasing force and the control port force, wherein the gap is configured so that a pressure at the inlet is greater than a pressure at the exhaust when the diaphragm moves from the closed position to the open position, and wherein the diaphragm is configured to move to the closed position when the vehicle emergency brake system is pressurized to disengage the emergency brake,
wherein when the diaphragm moves to the open position, fluid flows from the first opening of the inlet through the first and second passageways to the second opening of the inlet, from the second opening of the inlet to the fourth opening of the exhaust, and from the fourth opening of the exhaust through the fourth and third passageways to the third opening of the exhaust; and
a spring comprising a first end that abuts the wall and a second end positioned adjacent the diaphragm, wherein the spring exerts the biasing force on the diaphragm when the diaphragm is in the closed position and when the diaphragm is in the open position.

14. The valve of claim 13, wherein the valve seat surrounds the fourth opening.

15. The valve of claim 13, wherein the housing comprises a spring chamber within which the spring is positioned.

16. The valve of claim 15, further comprising a spring cup that is positioned between the spring and the diaphragm, and wherein the housing comprises a stop that engages the spring cup when the diaphragm is in the open position.

17. The valve of claim 16, wherein the diaphragm is elastomeric and the spring cup is rigid.

18. The valve of claim 13, wherein the housing comprises first and second halves, wherein a portion of the diaphragm is clamped between the first and second halves, wherein aligned openings in the first and second halves are configured to receive fasteners for joining the first and second halves, wherein the bracket is integrally formed with the second half, and wherein central axes of the aligned openings are spaced from the bracket in a direction that is perpendicular to the central axes of the aligned openings.

19. The valve of claim 18, wherein the first half comprises at least first, second, and third surfaces, wherein the first opening is formed in the first surface, wherein the third opening is formed in the second surface, and wherein the second and fourth openings are formed in the third surface.

20. The valve of claim 19, wherein the first and second surfaces are generally parallel and positioned on opposite sides of the housing, and wherein the third surface is generally perpendicular to the first and second surfaces.

* * * * *